United States Patent [19]

Suda et al.

[11] Patent Number: 4,552,446

[45] Date of Patent: Nov. 12, 1985

[54] LIGHT MEASUREMENT COMPENSATION DEVICE FOR CAMERA

[75] Inventors: Yasuo Suda; Kiyoshi Alyfuku; Akio Sunouchi; Nobuyuki Suzuki, all of Kanagawa, Japan

[73] Assignee: Canon Kabushiki Kaisha, Tokyo, Japan

[21] Appl. No.: 688,178

[22] Filed: Jan. 2, 1985

[30] Foreign Application Priority Data

Jan. 7, 1984 [JP] Japan .................................... 59-1220

[51] Int. Cl.$^4$ ............................................... G03B 7/08
[52] U.S. Cl. .................................... 354/429; 354/478
[58] Field of Search ............................... 354/429–434, 354/455, 478

[56] References Cited

U.S. PATENT DOCUMENTS 3,884,584  5/1975  Tsunekawa et al. ........... 354/429 X
3,896,462  7/1975  Taguchi et al. .................. 354/455 X
3,990,085  11/1976  Shono ............................ 354/455 X Primary Examiner—William B. Perkey
Attorney, Agent, or Firm—Toren, McGeady, Stanger, Goldberg & Kiel

[57] ABSTRACT

The disclosed light measurement compensation device for a camera includes the known resistors for aperture correction and for curvature correction in order to compensate for the error of light measurement in the full open aperture light measuring mode. The device also includes a resistor for compensating for the light measuring output difference present between two light measuring modes, or partial light measuring mode and average light measuring mode, and another resistor for shifting the light measuring output by a prescribed quantity. For this reason, even though the various light measuring modes, namely, full open aperture-average light measuring, stop down-partial light measuring, full open aperture-partial light measuring, and stop down-average light measuring modes, are selectively used, either an erroneous display or a drop of the exposure accuracy seldom takes place.

2 Claims, 15 Drawing Figures

FIG.8A
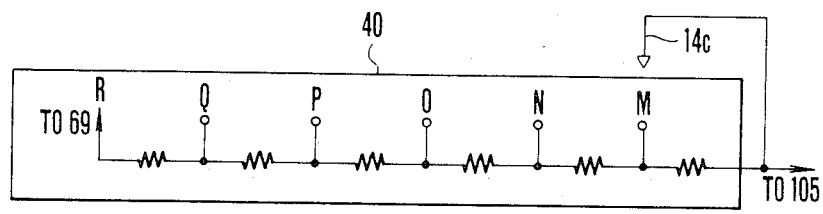
FIG.8B
| F-NO. AT FULL OPEN APERTURE | LIGHT MEASURING AT FULL OPEN APERTURE | | | | | | | | | | AT STOP DOWN |
|---|---|---|---|---|---|---|---|---|---|---|---|
| | 1.2 | 1.4 | 1.7 | 2.0 | 2.4 | 2.8 | 3.4 | 4.0 | 4.7 | 5.6 | 1.2 ~ 5.6 |
| CONTACT POSITION 14a | A | B | C | D | E | F | G | H | I | J | J |
| CONTACT POSITION 14b | 42K | 42K | 42K | 42K | 42K | 42K | 42K | 42K | 42K | 42K | 42L |
| CONTACT POSITION 14c | M | N | O | P | Q | R | R | R | R | R | R |
FIG.9
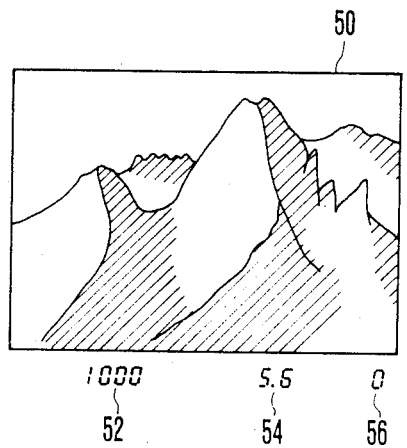

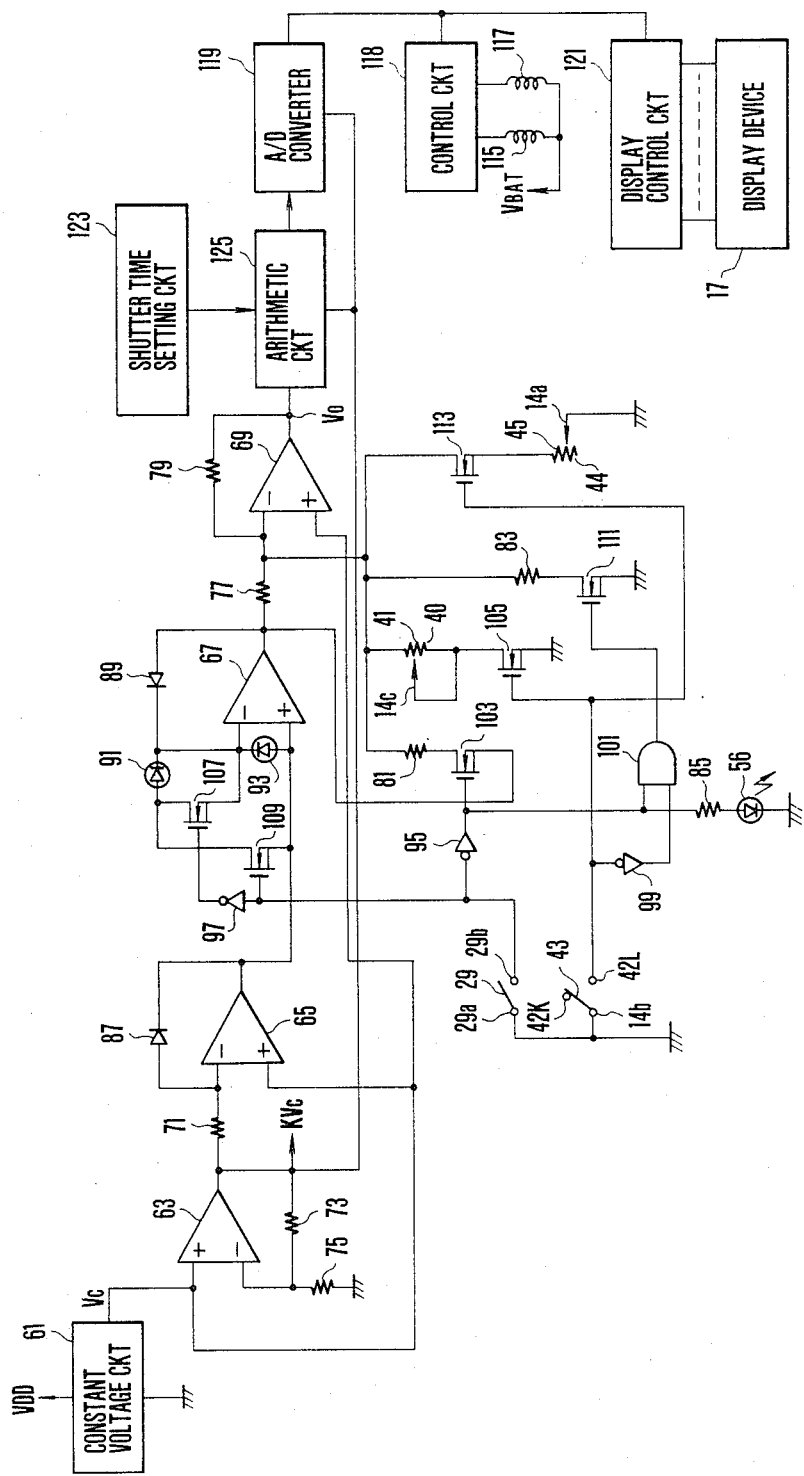
F I G. 10

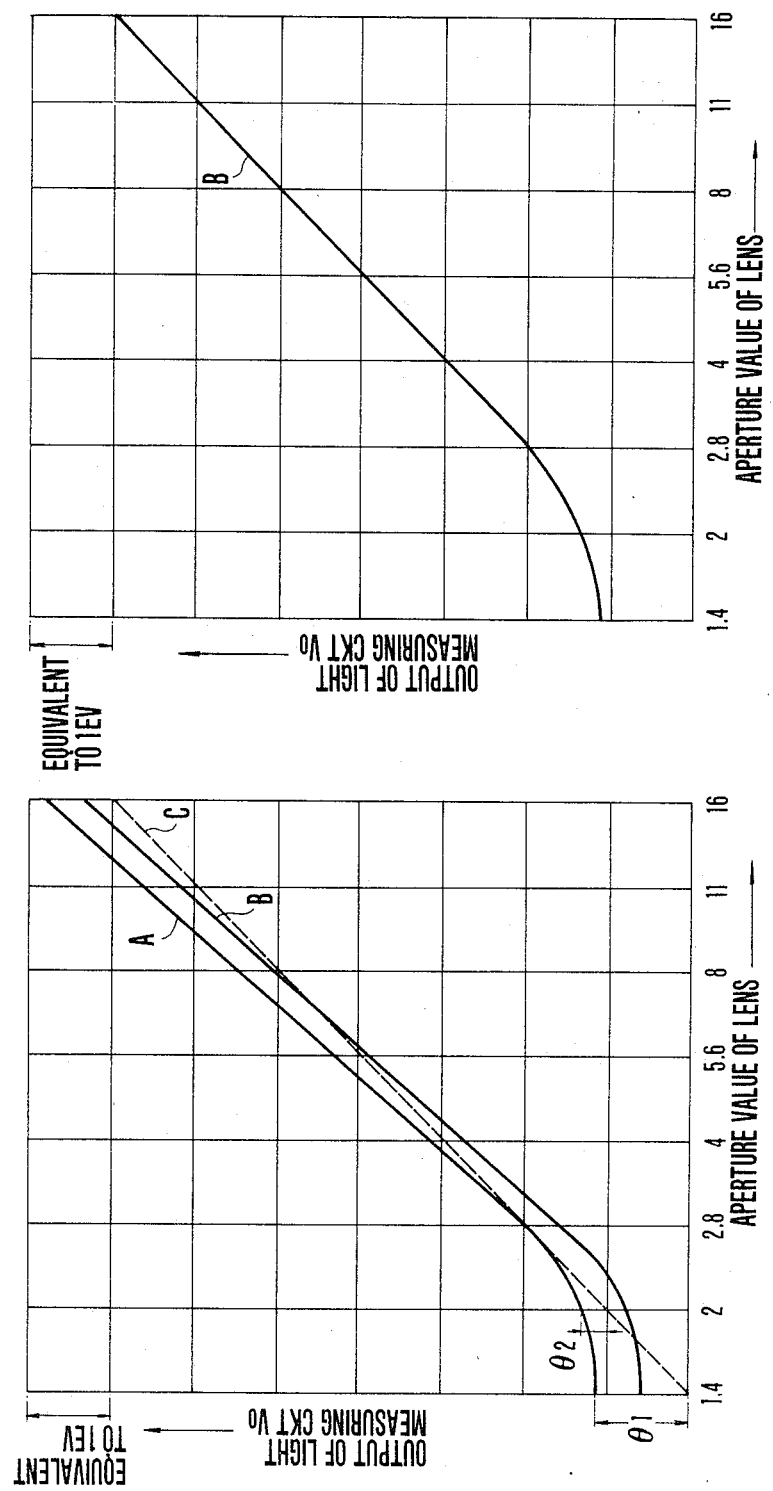

LIGHT MEASUREMENT COMPENSATION DEVICE FOR CAMERA

BACKGROUND OF THE INVENTION

1. Field of the Invention

This invention relates to a light measurement compensation device in the TTL light measuring type camera capable of changing over the distribution of sensitivity of the light measurement.

2. Description of the Prior Art

In general, the amount of light received by the photosensitive element in the TTL light measuring type camera is assumed to be proportional to the area of aperture opening of the diaphragm of the photographic lens. In a strict sense, however, there are cases where this proportional relationship does not hold. The first of these causes appears when the lens of a small F-number at full open aperture is used with the aperture full opened or thereabout (hereinafter called case A). The second cause appears when the partial light measuring mode is operated with a large F-number, that is, the aperture closed down (hereinafter called case B).

Here, the foregoing is further explained in more detail. FIG. 1 is a graph illustrating the relationship between the area of aperture opening of the photographic lens and the output of the light measuring circuit with a solid line curve A for the average light measurement and a dashed line curve B for partial light measurement. It is in the region of F/1.4, as the full open aperture, to F/2.8 that the light response characteristic becomes non-linear due to the diffusing property of the focusing screen glass plate, and therefore the proportional relationship is broken in the aforesaid case A. In other words, because the photosensitive element is arranged behind the focusing screen at either side of the eyepiece lens, or in the neighborhood of the penta prism, and because the focusing screen is not of perfect diffusing surface for the purpose of increasing the brightness of the finder image, as the size of the aperture opening of the lens approaches the full open F-number, the ratio of the straight going component to the diffusing component of the light incident on the photosensitive element varies. Thus, the output characteristic of the light measuring circuit becomes non-linear, and the proportional relationship does not hold. In this case, with the use of a faster lens than F/2.8 at the full open aperture, when the light measuring is performed with the full open aperture, an over-exposure will result throughout the entire range of adjustment of the size of aperture opening. For example, when F/1.4, or F/2.0, an exposure error corresponding to $\theta1$ or $\theta2$ (see FIG. 1) respectively is produced.

The correction for this exposure error, called curvature correction, is introduced into a system for processing the output of the light measuring circuit by an aperture correction pin on the lens mounting and a variable resistor in the camera body so that the apparent output characteristic of the light measuring circuit in the full open aperture-average light measuring and the full open aperture-partial light measuring modes becomes substantially equivalent to the output characteristic of the light measuring circuit when in the stop-down partial light measuring mode as indicated by a line AA in FIG. 1.

In the remaining region of F/2.8 to F/16, on the other hand, a gradient difference arises in the output characteristic of the light measuring circuit between the average and partial light measuring modes (the aforesaid case B). This is attributable to the arrangment of the light measuring optical system. Here, the outline of the light measuring optical system is illustrated in FIG. 2, where 301 is a photographic lens; 302 is a focusing screen having a split image prism 303; 304 is an eyepiece lens; 104 is a collection lens for the photosensitive element 31. The details of the light receiving surface of the element 31 is shown in FIG. 3, wherein as the photosensitive element 31 and the focusing screen 302 are conjugate to each other, when in the partial light measuring mode, the central area 93 only, or when in the average light measuring mode, the central area 93 and the surrounding area 91 in combination, is or are electrically selected. Since the light beam passing through the split image prism 303 on the focusing screen 302 does not diffuse, the smaller the size of aperture opening of the lens, the weaker the intensity of light incident on the photosensitive element 31 becomes. This is the same phenomenon as that the split image prism 303 casts shadow in the field of view of the finder when the diaphragm of the lens is stopped down. Because this phenomenon becomes more prominent as the proportion of the image of the split image prism 303 to the light receiving surface increases, for the average light measuring mode it has little influence, but for the partial light measuring mode, the influence creates a serious problem. The difference between the gradients of variation of the light value for the average and partial light measuring modes seen in FIG. 1 is based on such reason.

In the camera operating with selection of many light measuring sensitivity patterns such as the average and spot light measuring modes, therefore, when the camera was changed over between two of the stop down-average light measuring, stop down-spot light measuring, full open aperture-average light measuring and full open aperture-spot light measuring modes, there was produced as much a light value difference as not to be possible to compensate for by the prior known curvature correction technique alone. In connection with the example of FIG. 1, it has been found that when in the stop down-spot light measuring mode, the error is largest among the other modes, reaching 0.7 EV for the aperture value of F/11, and 0.8 EV for F/16 by which the actual exposure is more excessive than the correct one. With the use of a digital exposure display in 0.5 EV increments, as the light value difference takes more than 0.5 EV between the light measuring modes, there is a high possibility of production of a difference of 1.0 EV on the display. This leads to a problem of lowering the reliability and accuracy of exposure control.

SUMMARY OF THE INVENTION

An object of the invention is to provide a light measurement compensation device for a camera with means making it possible to reduce the light value difference resulting from the changeover between any two of the spot-at-full-open aperture, average-at-full-open-aperture, spot-at-stop-down, and average-at-stop-down light measuring modes.

Another object of the invention is to provide a light measurement compensation device which gives substantially no influence on the display even if such various light measuring modes as described above are selectively used.

Still another object of the invention is to provide a light measurement compensation device which gives substantially no influence on the accuracy of exposure control even if such various light measuring modes as described above are selectively used.

Other objects of the invention will become apparent from the following detailed description.

BRIEF DESCRIPTION OF THE DRAWINGS

FIG. 8A is a schematic diagram illustrating the details of another slide rheostat for curvature correction shown in FIG. 5.

FIG. 8B is a table showing functions of the aperture correction lever, the slide rheostat for aperture correction, the light measuring mode changeover switch and the slide rheostat for curvature correction shown in FIG. 5.

FIG. 9 is a pictorial representation of the viewfield of the finder of the camera shown in FIG. 4.

FIG. 10 is an electrical circuit diagram of the camera shown in FIG. 4.

FIGS. 11A to 11D are graphs considered to explain the output characteristic of the light measuring circuit of FIG. 10.

DETAILED DESCRIPTION OF THE PREFERRED EMBODIMENT

Figure 1:
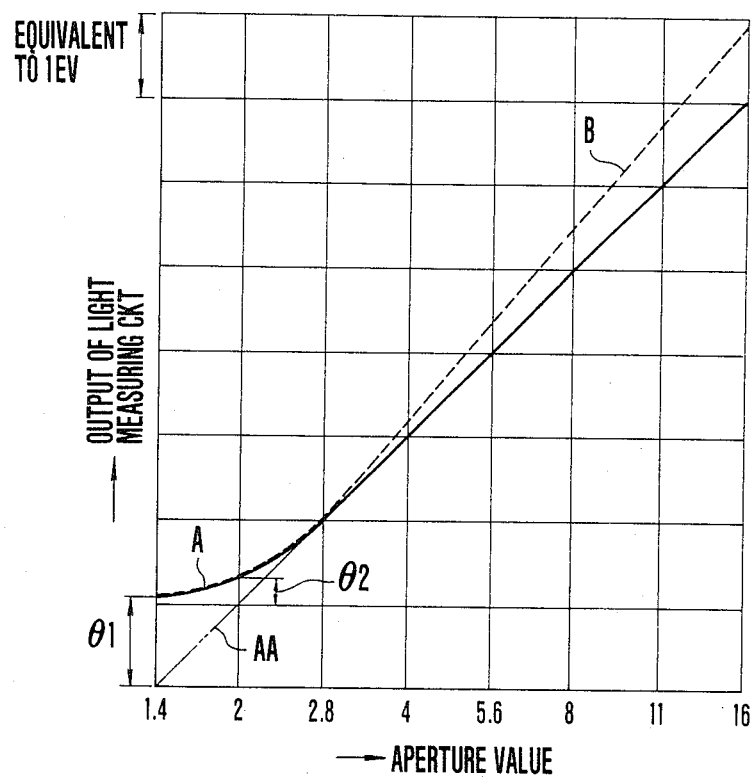
FIG. 1 is a graph illustrating the relationship between the area of aperture opening of the photographic lens and the output of the light measuring circuit.
Figure 2:
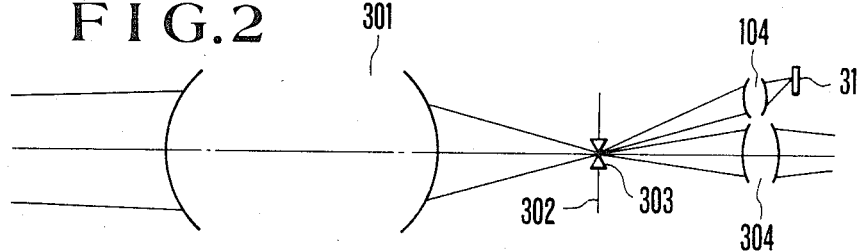
FIG. 2 is a schematic sectional view of the light measuring optical system.
Figure 3:
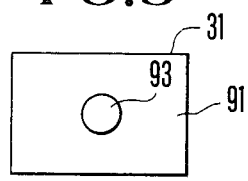
FIG. 3 is a plan view illustrating the details of the light receiving surface of the photosensitive element.
Figure 4:
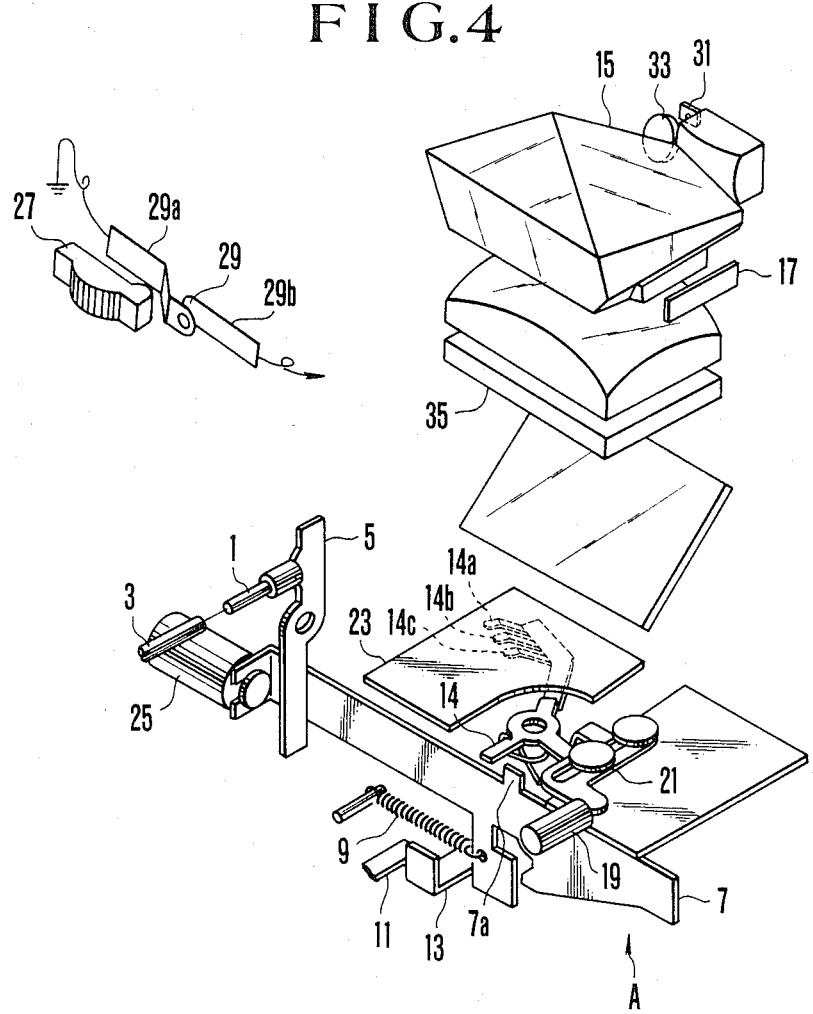
FIG. 4 is an exploded perspective view of a single lens reflex camera to which the present invention is applied.

FIG. 4 illustrates the construction and arrangement of the main parts of the single lens reflex camera employing one form of the present invention. 1 is a camera side auto-manual changeover pin for transmitting motion of a lens side auto-manual changeover pin 3 due to the operation of selecting the shutter priority mode of the lens into the camera body; 5 is an auto-manual changeover lever for transmitting the mechanical changeover signal of the automanual changeover pin 1; 7 is a stop-down slide plate for moving an automatic diaphragm lever 11 to a stop-down position through a camera side automatic diaphragm lever 13 by a stop-down spring 9 having power stored by the stop-down operation, and for simultaneously moving an aperture correction lever 14 by a portion 7a to change over the circuit to a stop-down light measuring state; 15 is a penta prism; 17 is a display device for displaying the aperture value and the shutter speed within the finder; 19 is an aperture correction pin of the camera for receiving a mechanical signal representing the full open F-number of the lens; 21 is a compensation slide plate for turning the aperture correction lever 14 with a sliding brush for an aperture correction resistor substrate 23 for converting the full open aperture F-number of the lens to an electrical signal; 14 is the aperture correction lever, which turns in correspondence to the full open aperture of the lens, to convert this to an electrical signal and when in the stop-down light measuring state, moving to the outside of a resistance pattern on the aperture correction resistor substrate 23 by the rising portion 7a of the slide plate 7; 23 is an aperture correction resistor substrate for converting the full open aperture F-number of the lens to the electrical signal; 9 is a stop-down spring for driving the stop-down slide plate 7 to move in a direction to stop down the diaphragm when an automatic diaphragm opening lock device (not shown) of known construction is released; 13 is a camera body side automatic diaphragm lever for moving the automatic diaphragm lever 11 of the lens to a stop-down position by a release operation and after the completion of running down movement of the shutter automatically returning to the full open aperture position, and capable, even by the manual stop-down operation, of moving the automatic diaphragm lever 11 to the stop-down position; 11 is an automatic diaphragm lever for stopping down the diaphragm of the lens from the full open state to the set value of aperture; the aforesaid automatic diaphragm full open locking device cooperates with a stop-down button 25 in such a manner that when the button 25 is once pushed down from the full open aperture light measuring position, the stop-down slide plate 7 is released from the locking connection, and when the stop-down button 25 is moved from the aforesaid position to a projected stop-down light measuring position and once more pushed down deeply of the aforesaid full open aperture light measuring projected position, the locking is caused to take place again in the aforesaid position. 3 is an auto-manual changeover pin of which the projected amount determines whether the lens is in the shutter speed priority exposure mode or the manual exposure mode and is transmitted to the camera body; 25 is a stop-down button for changing over between the stop-down light measuring and the full open aperture light measuring modes; 27 is a changeover lever for changing over between the average light measuring mode and the spot light measuring mode; 29 is a changeover switch having a contact 29a connected at its one end to the circuit earth and another contact 29b connected to an inverter to be described later and arranged to open and close in response to a slide knob 27, being open when in the spot light measuring mode and being closed when in the average light measuring mode. 31 is a sensor (see FIG. 3) consisting of a first photosensitive element 93 (to be described later) for receiving light from the central part of the scene, and a second photosensitive element 91 (to be described later) for receiving light from the environmental part; 33 is a light measuring lens for projecting the image on the focusing screen 35 to the sensor 31.

Figure 5:
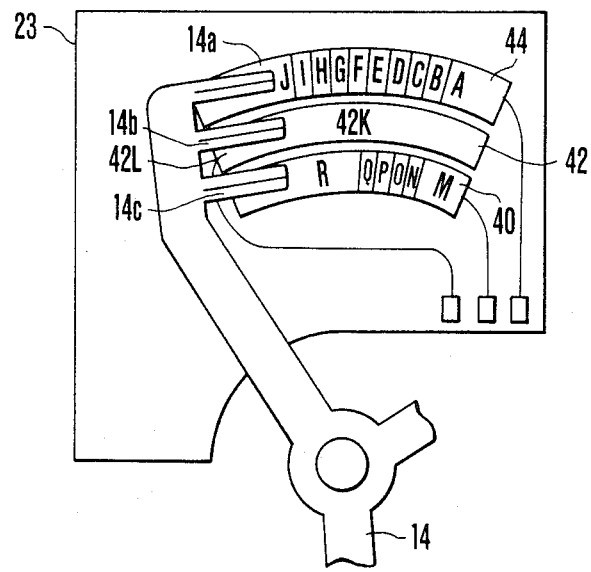
FIG. 5 is an elevational view illustrating the details of the aperture correction lever and the aperture correction base plate shown in FIG. 4.

FIG. 5 illustrates the details of the aforesaid aperture correction lever 14 and the aperture correction substrate 23 as looked from a direction A of FIG. 4. In FIG. 5, 40 is a slide rheostat for curvature correction with its one end connected to a brush 14c and a MOSFET (MOS type field effect transistor) 105 to be described later and with the other end connected to the negative input terminal of an amplifier 69 to be described later. 42 is a contact having a patch 42K and another patch 42L connected to an inverter to be described later and constituting a changeover switch 43 for the full open aperture light measuring mode and the stop-down light measuring mode together with a grounded brush 14b. 44 is a slide rheostat for aperture correction with its one end near the contact J connected to a MOSFET 113 to be described later.

Figure 6:
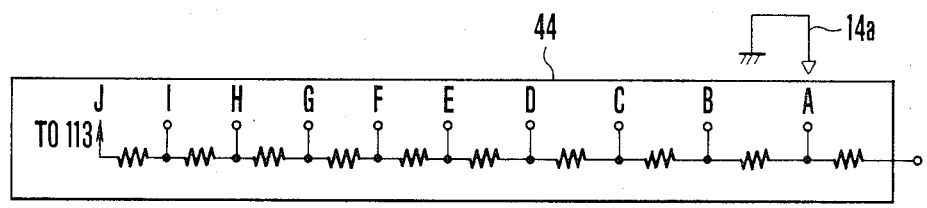
FIG. 6 is a schematic diagram illustrating the details of the slide rheostat for aperture correction shown in FIG. 4.

FIG. 6 illustrates the details of the slide rheostat 44 for aperture correction, said rheostat being constructed with a plurality of resistors of equal resistance value to one another with contacts A to J tapped out between the successive two resistors. And, the grounded brush 14a moves on said contacts A to J successively to contact therewith. The aforesaid rheostat 40 for curvature correction also is constructed with a plurality of resistors with contacts M to R tapped out between the successive two resistors as shown in FIG. 8A. And the brush 14c moves on said contacts M to R successively to contact therewith.

In this case, when the attached lens has a full open F-number of F/1.2, the brush 14a comes to contact with the tap A (see FIG. 6) of the slide rheostat 44, the brush 14b to contact with the patch 42K, and the brush 14c to contact with the tap M of the slide rheostat 40. Also when the full open F-number of the attached lens is F/1.4, the brush 14a contacts with the tap B of the slide rheostat 44, the brush 14b contacts with the patch 42K and the brush 14c contacts with the tap N of the slide rheostat 40. For note, when other lenses of F/1.7 to F/5.6 at full open aperture are attached, the brushes 14a, 14b and 14c are in contact with the corresponding ones of the taps of the rheostats 44 and 40 and either one of the patches 42K and 42L, as shown in FIG. 8B.

FIG. 9 is for explaining the display within the finder of the camera shown in FIG. 4, where 50 is the field of view of the finder; 52 is a shutter speed display portion; 54 is an aperture display portion; 56 is a display device for indicating the spot light measuring mode.

Figure 7:
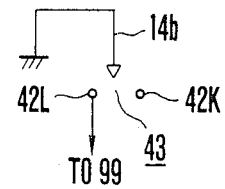
FIG. 7 is a schematic diagram illustrating the details of the changeover switch shown in FIG. 5.

FIG. 10 illustrates the main parts of the electrical circuitry of the camera shown in FIG. 4, where 61 is a constant voltage circuit connected to an electrical power source $V_{DD}$ to produce a constant voltage Vc. 63–69 are operational amplifiers (hereinafter referred to as "op.amp."); 71 to 79 are resistors; 41 and 45 are the aforesaid rheostats; 81, 83, 85 are resistors; 87, 89 are diodes; 91, 93 are the aforesaid photo-diodes for converting the light passed through the lens to current. 56 is the aforesaid light-emitting diode arranged within the finder. 95–99 are inverters; 101 is an AND gate; 103–113 are MOSFETs; 29 is the changeover switch shown in FIG. 4 with its one end connected to the input terminal of the inverter 95. 43 is the changeover switch shown in FIGS. 5 and 7. 115, 117 are magnets controlling a diaphragm and a shutter curtain (not shown); 118 is a known control circuit for controlling the magnets 115 and 117; 119 is an A/D converter for producing a digital quantity corresponding to the proper exposure value; 121 is a diaplsy control circuit including a decoder for converting the output of the A/D converter 119 to a signal suited to a display device 17 of seven-segment form. 123 is a shutter time setting circuit for producing an analog signal corresponding to the selected shutter time value, the output of said circuit 123 after having been computed with the output of the op.amp. 69 by an arithmetic circuit 125 being given to the A/D converter 119.

The operation of the camera of such construction is as follows: When a release button (not shown) is pushed down, the electrical power source is thrown to the electrical circuit of FIG. 10. Receptive of the voltage Vc from the constant voltage circuit 61, the op.amp. 63 and the resistors 73 and 75 produce a voltage KVc (where K>1) which is applied as an electrical power source to the arithmetic circuit 125 and the A/D converter 119 and through the buffer amplifier 65 to the positive input terminal of the op.amp. 67 of the light measuring circuit as a reference electrical power source.

At first explanation is made in connection with that the spot light measuring mode at the full open aperture.

(1) In the case of the full open aperture-spot light measuring mode:

At first, when a photographic lens (not shown) is attached to the camera, the aperture correction pin 19 is pushed backward by a corresponding distance to the aperture $F_{NO}$ (also called full open aperture F value) of the attached lens. Therefore, the aperture correction lever 14 is turned by a corresponding angle to the distance the aperture correction pin 19 has moved, thereby the brush 14a is brought into contact with a corresponding one of the taps of the slide rheostat 44 for aperture correction to the full open aperture F value of the lens. Therefore, the resistance of the slide rheostat 45 for aperture correction (see FIG. 10) is adjusted to a corresponding value to the full open aperture F value of the lens. Also such rotative movement of the aperture correction lever 14 causes the brush to come to a corresponding one of the taps of the slide rheostat 40 for curvature correction to the full open aperture F value of the lens, for example, the tap M when the full open aperture F value of the lens is F/1.2 (see FIGS. 8A and 8B). Therefore, the resistance of the slide rheostat 41 for curvature correction is also adjusted to a corresponding value to the full open aperture F value of the lens.

Meanwhile, in the case when the light measuring mode is with the aperture at full open, the stop-down button 25 stays in the position of FIG. 4 where the brush 14b (see FIG. 7) of the aperture correction lever 14 is in contact with the patch 42K as shown in FIG. 8B so that both FETs 107 and 113 are ON. Therefore, when in the full open aperture-spot light measuring mode, the rheostats 41 and 45 having such resistance values as has been described above are connected to the negative input terminal of the op.amp. 69.

Also in the case of the full open aperture-spot light measuring mode, as the changeover lever 27 (see FIG. 4) has been moved to the right by the photographer, the changeover switch 29 is ON, causing the FET 107 to be ON and the FET 109 to be OFF. Therefore, only the first photosensitive element 93 for receiving light from only the central portion of the scene to be photographed is connected to the op.amp. 67. Also as has been described above, by the selection of the spot light measuring mode, when the changeover switch 29 turns on, the gate of the MOSFET 103 becomes high level so that the FET 103 turns on, thereby the resistor 81 for compensating the inclination of the output characteristic of the light measuring circuit is also connected to the negative input terminal of the op.amp. 69. When the light receiving area of the sensor 31 changes between the spot light measuring and the average light measuring modes, a light measuring output difference is produced. This is compensated by the resistor 81.

Figure 11A:
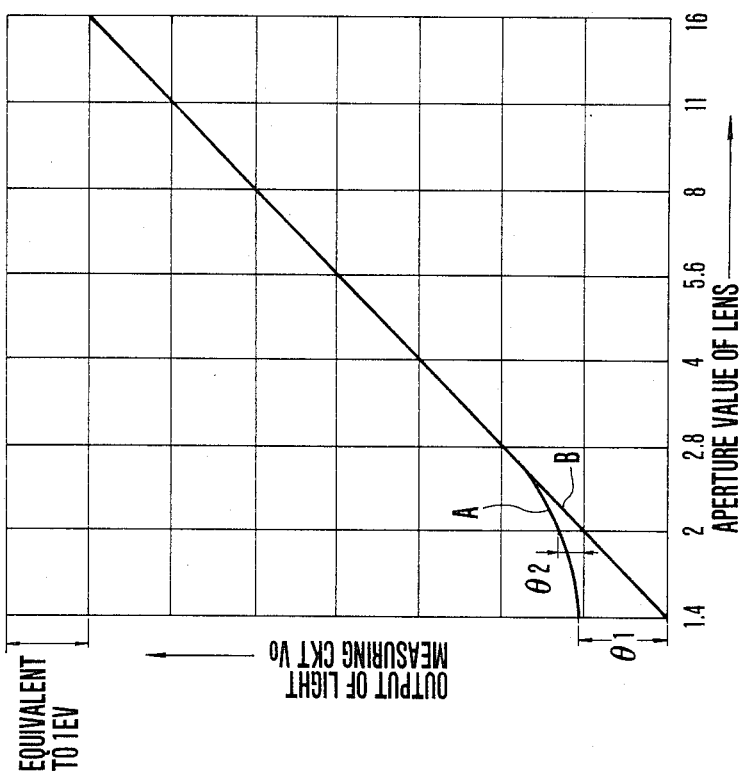
Figure 11B:
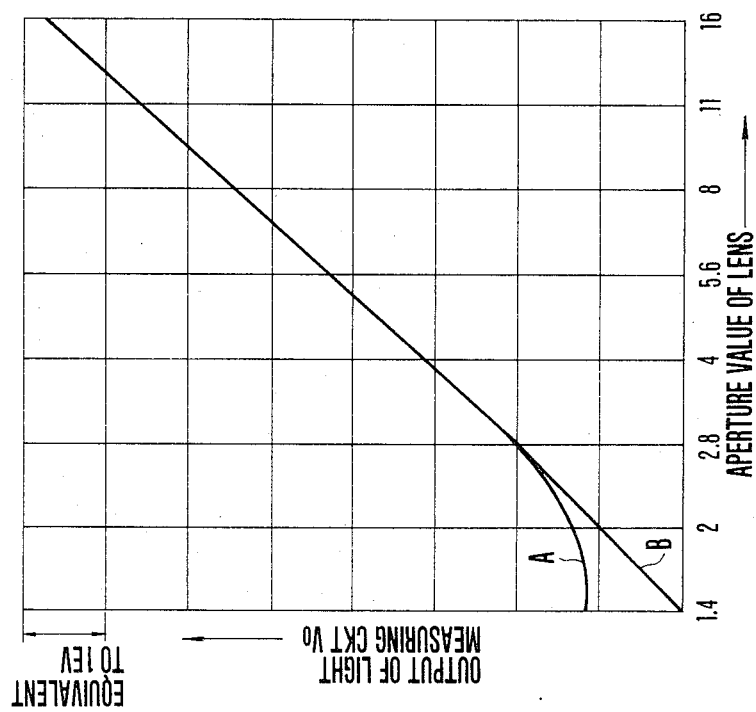

Next explanation is made about the compensated light measuring output by the resistor 81 by reference to FIG. 11A. For note, in FIGS. 11A to 11D, the output characteristic for aperture value F/1.2 is omitted for the purpose of simplifying the drawing. Because the negative input terminal of the op.amp. 69 is connected to the rheostat 41 for curvature correction, the output characteristic of the light measuring circuit is corrected from the output characteristic A of the light measuring circuit which would result when the curvature correction resistor 41 is not connected to the op.amp. 69 in the region of F/1.4 to F/2.8 to an output characteristic B.

In general, the full open F-numbers of the lenses fall in the region of F/1.4 to F/5.6. If the lineality of the light measuring output is as good as shown in FIG. 11A in the region of F/1.4 to F/5.6 in FIG. 11A, therefore, in actual practice, there is produced no problem. In the example shown in FIG. 11A, the maximum error is in the order of Ev 0.3 (when F/5.6), being negligible on practical use.

(2) The full open aperture-average light measuring mode:

At first when a photographic lens is attached to the camera, the aperture correction pin 19 is pushed backward by a corresponding distance to the full open F value of the attached lens so that, similarly to the above-described full open aperture-spot light measuring mode, the slide rheostat for aperture correction 45 takes a corresponding resistance value to the full open F value of the attached lens. Also the slide rheostat for curvature correction takes a corresponding resistance value to the full open F value of the lens.

Meanwhile, when the light measuring mode is operated with the aperture at full open, the stop-down button 25, similarly to the above-described full open aperture-spot light measuring mode, stays in the position of FIG. 4. In the case of this light measuring mode too, therefore, the rheostats 41 and 45 having such resistance values as has been described above are connected to the negative input terminal of the op.amp. 69.

For the average light measuring mode, as the change-over lever 27 has been moved to the left, the change-over switch 29 is OFF, the FET 107 is OFF, and the FET 109 is ON. Thus, both of the first and second photosensitive elements 91 and 93 are selected for converting the strength of light from the entire of the scene to an electrical signal.

Also, the selection of the average light measuring mode causes the FET 103 to turn off as the changeover switch 29 turns off (open) as has been described above, thereby the resistor 81 for compensating the light measuring output when in the spot light measuring mode is electrically cut off from the negative input terminal of the op.amp. 69.

Therefore, in the case of the full open aperture-average light measuring mode, the aforesaid resistor 81 is cut off, and the curvature correction resistor 41 is connected in, so that the output characteristic of the light measuring circuit becomes an output characteristic B (see FIG. 11B) resulting from the correction of the output characteristic of the region of F/1.4 to F/2.8 in the output characteristic A (see FIG. 11B) of the light measuring circuit which would result when the curvature correction resistor 41 is not connected to the op.amp. 69. Therefore, the output characteristics for the full open aperture-spot light measuring mode and the full open aperture-average light measuring mode become states which can be recharged as the same on actual use.

(3) The stop down-spot light measuring mode:

When a photographic lens is attached to the camera, similarly to the foregoing light measuring modes, the slide rheostat 45 for aperture correction and the slide rheostat 41 for curvature correction take corresponding resistance values to the full open F value of the lens. However, as is different from the above-described full open aperture light measuring mode, when in the stop down light measuring mode, the brush 14b (see FIG. 5, FIG. 7) of the aperture correction lever 14 is brought into connection with the other patch 42L as shown in FIG. 8A, so that both of the FETs 105 and 113 (see FIG. 10) turn off. In the stop downspot light measuring mode, therefore, the rheostats 41 and 45 are electrically cut off from the op.amp. 69.

Also, when the stop down light measuring mode is selected, the input terminal of the inverter 99 is low level, and, therefore, one of the input terminals of the AND gate 101 becomes high level.

Further in this case, because the spot light measuring mode is selected, the output terminal of the inverter 95 becomes high level and the LED 56 is lighted on, displaying in the finder that the light measuring mode is the spot light measuring mode.

Also as has been described above, when the output terminal of the inverter 95 becomes high level, the FET 103 turns on, thereby the resistor 81 for compensating the inclination of the output characteristic of the light measuring circuit is connected to the negative input terminal of the op.amp. 69.

Furthermore, the change of the output terminal of the inverter 95 to high level causes change of the output of the AND gate 101 to high level, thereby the resistor 83 for parallel shifting the output characteristic of the light measuring circuit is connected to the negative input terminal of the op.amp. 69.

In the case of the stop down-spot light measuring mode, therefore, what is connected to the negative input terminal of the op.amp 69 is the resistors 81 and 83 out of the correction resistors 41, 45, 81 and 83, so that the output characteristic of the light measuring circuit (the output characteristic of the output terminal of the op.amp. 69) becomes such as an output characteristic B in FIG. 11C. As this output characteristic B is compared with another output characteristic C (see FIG. 11C) for the full open-average light measuring mode, their difference even at maximum is in the order of 0.5 steps, giving no bad influence on the display or the like.

(4) The stop down-average light measuring mode:

In such stop down light measuring mode, as has been described above, the brush 14b of the aperture correction lever 14 is connected to the path 42L, so that the rheostats 41 and 42 are electrically cut off from the op.amp. 69.

Also in the average light measuring mode, because the changeover switch 29 is OFF as has been described above, the FETs 103 and 111 both become OFF so that the correction resistors 81 and 83 are also cut off from the op.amp. 69.

Therefore, at the output terminal of the light measuring circuit or the output of the op.amp. 69 there is produced a signal from only the sensor of the elements 91 and 93. Thus, its output characteristic becomes such an output characteristic as shown in FIG. 11D. For note, in said stop down light measuring mode, the full open side apertures are of little use. Therefore, though the output characteristic is deviated from the ideal value in the region of F/1.4 to F/2.8 as shown in FIG. 11D, there is no problem on actual use. For note, the resistance values of the correction resistors 81 and 83 are determined in the following way.

At first, the output voltage of the op.amp. 69 for the same object brightness after the correction in each of the full open aperture-spot light measuring mode and the full open aperture-average light measuring mode is denoted by Vo, and the resistance values of the resistors 77, 79 and 81 are denoted by R, R1 and R2 respectively. Also the output voltages of the op.amp. 67 for the same object brightness after the correction in the aforesaid two modes are denoted by Va and Vb respectively, the output voltage of the constant voltage circuit 61 by Vc and the output voltage of the op.amp. 63 by KVc.

In this case, since there is need to carry out the correction so as to reduce the output difference at the output terminal of the op.amp. 69 between the two modes to zero, (see FIGS. 11A and 11B), $$\frac{Va - Vc}{R} = \frac{Vc - Vo}{R1} \tag{1}$$

$$\frac{Vb - Vc}{R \cdot R2/R + R2} = \frac{Vc - Vo}{R1} \tag{2}$$

must be established. From equations (1) and (2), the required value R2 of resistance of resistance of the resistor 81 is found to be $$R2 = R \times \frac{KVb - Vc}{Va - Vb} \tag{3}$$

In the case of the above-described embodiment, the resistance value R2 is determined based on the equation (3).

For another resistor 83, in order to shift the output of the light measuring circuit by, for example, 0.5 steps, the resistance value of the correction resistor 83 is determined in the following way. The resistance value of the resistor 83 is denoted by R3, and the output voltages of the op.amps. 67 and 69 before correction by the correction resistor 83 by Vc and Ve and after correction by Vd and V(e−0.5) respectively. Then, $$\frac{Vd - Vc}{R} = \frac{Vc - Ve}{R1} \tag{4}$$

$$\frac{Vd - Vc}{R} = \frac{Vc - V(e - 0.5)}{R1} + \frac{Vc}{R3} \tag{5}$$

From equations (4) and (5), $$\frac{Vc - Ve}{R1} = \frac{Vc - V(e - 0.5)}{R1} + \frac{Vc}{R3} \tag{6}$$

$$R3 = R1Vc/(V(e - 0.5) - Ve) \tag{7}$$

By determining the resistance value R3 of the resistor 83 based on the formula (7), the difference between the light measuring outputs when in the stop down-spot light measuring mode and the full open aperture-average light measuring mode is reduced to less than 0.5 steps. Even in application to the camera of the display in 0.5 EV increments, there is no possibility of occurrence of a display difference amounting up to 1.0 EV.

For note, as to the display and exposure control based on the output of the aforesaid light measuring circuit, it is almost similar to the conventional device, and is no more explained.

As has been described above, according to the present invention, the output of the light measuring circuit is made almost unchangeable with the change of the light measuring mode, thereby giving an advantage that there is almost no possibility of the changeover of the light measuring mode, thereby giving an advantage that there is almost no possibility of the changeover of the light measuring mode resulting in an erroneous display or a drop of the accuracy of exposure control.

What is claimed is:

1. A light measuring device for a camera capable of selecting a full open aperture light measuring mode, a stop-down light measuring mode, an average light measuring mode and a spot light measuring mode, comprising:
   (a) light measuring means for producing a corresponding electrical signal to the intensity of an incident light from an object to be photographed; and
   (b) means for shifting an output of said light measuring means by a prescribed quantity when said stop down light measuring mode and the spot light measuring mode are selected.

2. A light measuring device according to claim 1, wherein
   said shifting means includes a resistor having a predetermined resistance value.

* * * * *